W. J. GAGNON.
JUMP RING COUPLING.
APPLICATION FILED MAR. 21, 1918.
1,270,720.
Patented June 25, 1918.
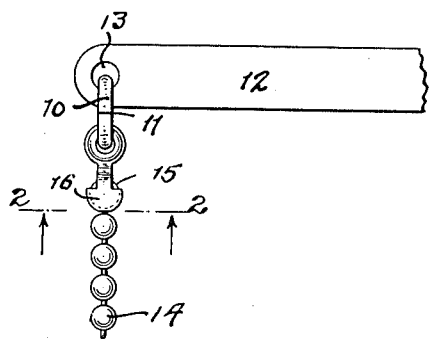
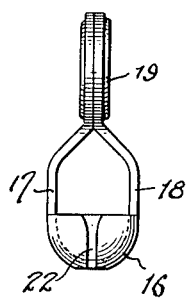
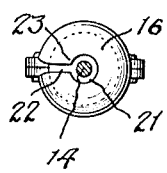
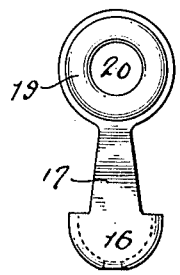
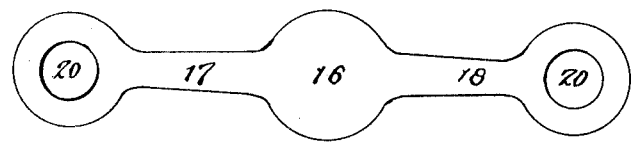
Inventor:
by   WILLIAM J. GAGNON
     Attys.

UNITED STATES PATENT OFFICE.

WILLIAM J. GAGNON, OF BRIDGEPORT, CONNECTICUT, ASSIGNOR TO THE BEAD CHAIN MANUFACTURING COMPANY, OF BRIDGEPORT, CONNECTICUT, A CORPORATION OF CONNECTICUT.

JUMP-RING COUPLING.

1,270,720.   Specification of Letters Patent.   Patented June 25, 1918.

Application filed March 21, 1918. Serial No. 223,780.

*To all whom it may concern:*

Be it known that I, WILLIAM J. GAGNON, a citizen of the United States of America, residing at Bridgeport, in the county of Fairfield and State of Connecticut, have invented certain new and useful Improvements in Jump-Ring Couplings, of which the following is a specification.

My invention relates to jump ring couplings, and the object of my invention is to provide a combined socket and eye member adapted to make connection on the one hand with the jump ring and on the other hand with the end ball of a bead chain, and particularly to provide an efficient device for this purpose which is readily manufactured, efficient in operation, and to which the jump ring and chain end may be quickly and securely fastened.

In the accompanying drawings,

Figure 1 is a side elevation of a jump ring connection in which my invention is embodied in one form;

Fig. 2 is a section on the line 2—2, Fig. 1, but drawn to a larger scale;

Fig. 3 is a side elevation of the coupling member alone;

Fig. 4 is a side elevation at right angles to Fig. 3; and

Fig. 5 is a plan of the blank of sheet metal from which the device is formed.

Referring to the drawings, the jump ring 10, which is split at 11 in the usual manner, is here shown hung from a lever 12, through the eye 13 of which it is passed. Hanging from the ring is the bead chain 14, the end ball 15 of which is engaged by the coupling to which my invention particularly relates.

The coupling, as here shown, comprises a cup-shaped bottom 16 substantially corresponding in internal diameter and contour to that of one of the balls of the chain 14. Extending upward from opposite sides of the cup are arms 17 and 18, the ends of which are offset toward each other and juxtaposed. A hollow rivet 19, passed through the holes 20 therein and spread against the outer faces of the ends of the arms, holds the latter securely together.

The cup 16 is pierced at its bottom by a hole 21 of slightly greater diameter than that of a link between the chain balls, in order freely to accommodate the link in assembled position of the parts. The side of the cup 16 is slit at 22 from the margin of the cup to the hole 21. The marginal end of the slit is of greater width than that at the bottom of the cup communicating with the hole 20, and the diameter of the slit at its narrow portion is less than that of one of the links of the chain. Moreover, at the point at which the narrow end of the slot enters the hole 21, it is flanked by corners 23 which are sharp and substantially right angular. As a result of this construction, while the link may be readily passed down through the V-shaped slot, it is almost impossible to force it out therethrough after it has once entered the hole 21.

The length of the arms 17 and 18 between the margin of the cup and their junction at the eyelet 19 is so predetermined and the arms so shaped, that the end ball of the chain may be passed into position above the cup with the connecting link thereof properly positioned to enter the slit 22. It will be noted, furthermore, that the eye end of the coupling lies in substantially the same plane as that of the slit 22. This greatly facilitates the assembly of the ball and connector by hand, which is the usual practice.

In the construction illustrated, the coupling is shaped from a blank of sheet metal stamped to the form indicated in Fig. 5. By pressing the blank in a suitable forming die, the cup 16 is formed, the hole 21 and slot 22 cut therein, and the arms 17 and 18 brought up toward each other. A simple eye-letting operation secures the hollow rivet 19 in the holes 20 and unites the arms permanently in position.

While the construction shown indicates that which I have found to be the most economical and efficient, I do not limit my claim of invention to this precise construction, which may be departed from in various details readily occurring to those skilled in the art.

I claim:

1. A jump ring coupling having at one end an open cup with centrally apertured bottom and slit side, the slit extending from said aperture to the margin of the cup, integral arms extending from the opposite margins of the cup and offset into juxtaposition at their ends above the open end of the cup, said ends being perforated in register to receive a jump ring.

2. A jump ring coupling having at one end an open cup with centrally apertured bottom and slit side, the slit extending from said aperture to the margin of the cup, integral arms extending from the opposite margins of the cup and offset into juxtaposition at their ends above the open end of the cup, together with a hollow rivet uniting said arm ends and affording a hole to receive a jump ring.

3. A jump ring coupling having at one end an open cup to receive the end ball of a bead chain, the cup bottom being centrally apertured to receive the end ball chain link, and the side of the cup being slit from said aperture to the margin of the cup to permit the passage of the chain link therethrough to said aperture, said slit being of less diameter than the chain link and being flanked at the aperture by sharp corners serving to prevent the accidental reëntry of the link into said slot.

In testimony whereof I have signed my name to this specification.

WILLIAM J. GAGNON.